United States Patent [19]

Troy et al.

[11] Patent Number: 4,637,634
[45] Date of Patent: Jan. 20, 1987

[54] TWO-PART BANK DRAFT

[76] Inventors: Seymour L. Troy; Kenneth E. Mullenix, both of P.O. Box 5027, Ft. Lauderdale, Fla. 33310

[21] Appl. No.: 758,477

[22] Filed: Jul. 24, 1985

[51] Int. Cl.⁴ .................. B42D 15/00; G06G 7/14
[52] U.S. Cl. ........................................ 283/98; 283/58; 364/408
[58] Field of Search ............... 283/56, 67, 96–102, 283/91, 58; 273/138 R, 139; 364/408

[56] References Cited

U.S. PATENT DOCUMENTS

| 654,387 | 7/1900 | Crampton | 283/98 |
| 675,766 | 6/1901 | Black | 283/98 |
| 876,794 | 1/1908 | Fritch et al. | 283/98 |
| 3,290,061 | 12/1966 | Glassman | 283/98 |
| 3,511,181 | 5/1970 | McGiffen et al. | 283/98 |
| 3,802,724 | 4/1974 | Gosnell | 283/101 |
| 4,151,667 | 5/1979 | Idelson et al. | 283/97 |
| 4,260,656 | 4/1981 | Mullen | 283/100 |
| 4,321,672 | 3/1982 | Braun et al. | 364/408 |
| 4,398,708 | 8/1983 | Goldman et al. | 273/139 |

Primary Examiner—Paul A. Bell
Assistant Examiner—Paul M. Heyrana, Sr.
Attorney, Agent, or Firm—Kane, Dalsimer, Kane, Sullivan and Kurucz

[57] ABSTRACT

A sales promotional system includes distribution to a consumer of a first sheet including certain elements of a bankable bank draft and providing instructions for obtaining a second sheet including the remaining requisite elements for the bankable bank draft. The participant obtains the second sheet (e.g. by purchasing a designated product) and if the check parts match, combines the first and second sheets to create a bankable entity. Validation procedures are employed to assure that submitted check combinations are genuine.

21 Claims, 9 Drawing Figures

ENDORSEMENT
ALLOW A TIME DELAY FOR VALIDATION

Signature

Street Address

City                              States    Zip
(      )
Telephone

Bank Account #              Soc. Sec. #

WE ARE PLEASED TO SERVE YOU IN
YOUR CAR PURCHASES AND CAR
SERVICING NEEDS.
ETC.
ETC.
ETC.

NO. PURCHASE NECESSARY IN ORDER TO
RECEIVE THE BOTTOM HALF OF THE CHECK.

PAT. PENDING

COPYRIGHT ELECTRONICS MANAGEMENT SYSTEM

TWO-PART BANK DRAFT

FIELD OF THE INVENTION

This invention pertains to an apparatus and method for piecing together a bankable or negotiable instrument for sales promotion, and more particularly to a two part promotional check (or draft) to be combined with additional parts by a consumer for direct deposit or cashing at a bank.

BACKGROUND OF THE INVENTION

Numerous sales promotion systems are in use in the marketplace today. One common promotional activity is a sweepstakes offer in which consumers are invited to mail in entries, the winners to be chosen in a lottery style selection. However, this system encourages many non-buyers of the item being promoted to take advantage of the sweepstakes but not to purchase the item being promoted.

Another promotional system includes product producers mailing samples to home occupants when introducing new products. Commonly, an insert is provided with a cents-off coupon enclosed to encourage a store sale.

Conventional promotional systems have the disadvantage of being single step in nature with the consequential disadvantage that either nominal sums are offered, as in the case of a cents-off coupon, or, as in a sweepstakes, the consumer is merely one of a large pool of participants having no advantage over the others. Further, the consumer is obliged to wait for the winner's selection for lengthy periods of time as dictated by the sponsor's rules.

As can be seen from the above, current sales promotional methods are limited in application and level of encouragement to a consumer.

SUMMARY OF THE INVENTION

In this description the term "check" includes a bank draft. The term "bankable" means acceptable to a bank, i.e. being "depositable" or "cashable".

According to the present invention a part of a full bodied check is held by a consumer subject to assembly with the other parts, when obtained, to form a bankable entity.

A sales promotion means is provided whereby a consumer is given one or more standard size bankable check parts via standard methods of distribution, e.g., the first check part (TOP PORTION CHECK) is not usually in-pack or on-pack at any time but is obtained mostly as follows, i.e.:
1. Direct Mail.
2. Insert—magazine, newspapers, etc.
3. Car rental—Issued with Rental Contract
4. Baby diapers—Pay to ------- Personalized to the new baby.
5. Etc., etc.

The second check part (BOTTOM PORTION CHECK) is always at the point of termination, i.e.:
1. Product purchased.
2. Bill paid timely.
3. Rented car turned in.
4. Diapers purchased.

The checks are so designed as to conform to the Uniform Commercial Code (UCC) guidelines under Article III relating to a form of a bank check, but may be so constituted as to become a bank draft. The check on its face appears to be a standard bank check. The reason for a draft being preferred is that a check is handled by a bank with standard clearing procedures while a draft is handled by clearing procedures subject to conditions as stated on the draft. It is contemplated that the draft of the present invention is to be physically isolated at the designated clearing bank and is made available to a verification and/or validation process prior to re-routing into the clearing process for payment. Alternately the present invention may be used completely in house, e.g., a company may distribute the checks for employee incentive then cash the completed checks for the employee.

The primary advantage of the present invention is that the checks are issued to carry high script dollar amount values. Thus incentive is provided to a holder of a first part of the check to seek out the dollar matching part.

Another advantage is that the dollar value match directly creates a bankable entity increasing incentive to the consumer in that an immediate gratification is effected and an overall efficiency of the system administration is a result.

Another advantage is that the promotion is a two (or more) step process, the first step (receipt of a check part) putting a holder at a distinct advantage as compared to other style program participants while the award offered to the holder is immediate and substantial. It is contemplated that a holder of a large dollar amount check part will actively seek out a matching check part.

Many advantageous uses are contemplated. Rather than the cents-off coupon mailed with a sample commonly used in the past, a check part may be inserted with the sample along with a reference that each store package of the brand involved carries check parts, some of which match the part in possession of the participant, the missing identification number and dollar sign amount.

Another example of an advantageous use includes a situation where an electric company issues a bill due by a specific date. Untimely payment loses interest for the creditor. To encourage timely payments the creditor mails with its bill one of the check parts of the invention. The debtor is advised that if timely payment is received, the next bill rendered will include a check part, a possible match with the first part sent. Each month a new check part is mailed for an ongoing program.

Other advantageous examples exist including encouraging airline passengers not to switch planes by providing a check part when obtaining the ticket, and providing the missing portion of the check to the passenger when he is seated in the plane. Such parts may be envelope encapsulated to avoid selective pilferage.

Store or agency traffic may also be increased by distributing incomplete checks by the many and varied conventional channels used. To complete the check a participant must pick up a matching part by visiting the establishment.

To achieve the above objects and advantages the present invention provides a sales promotional check for direct deposit or cashing at a bank as a bank draft comprising:

a first preprinted sheet having at least a portion which conforms to a bankable bank draft and having identifying information thereon;

a second sheet containing identifying information thereon, the identifying information matching the identifying information on the first sheet, the first and second sheets combining to form a bankable bank draft.

It is noted that the identifying information on either sheet may relate to each other, only in that said identifying information identifies the same dollar amount.

DETAILED DESCRIPTION OF THE PREFERRED EMBODIMENT

Figure 1:
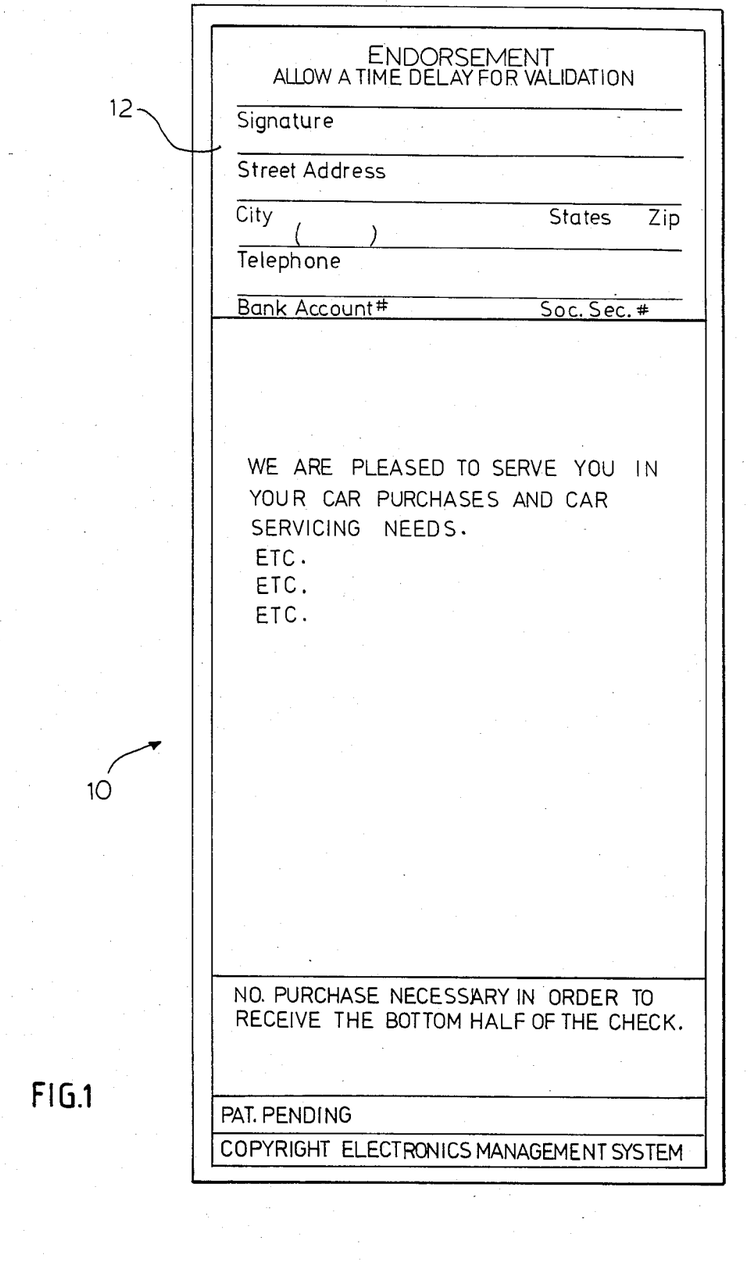
FIG. 1 is an elevated view of the back of a check according to a first embodiment of the present invention.
Figure 2:
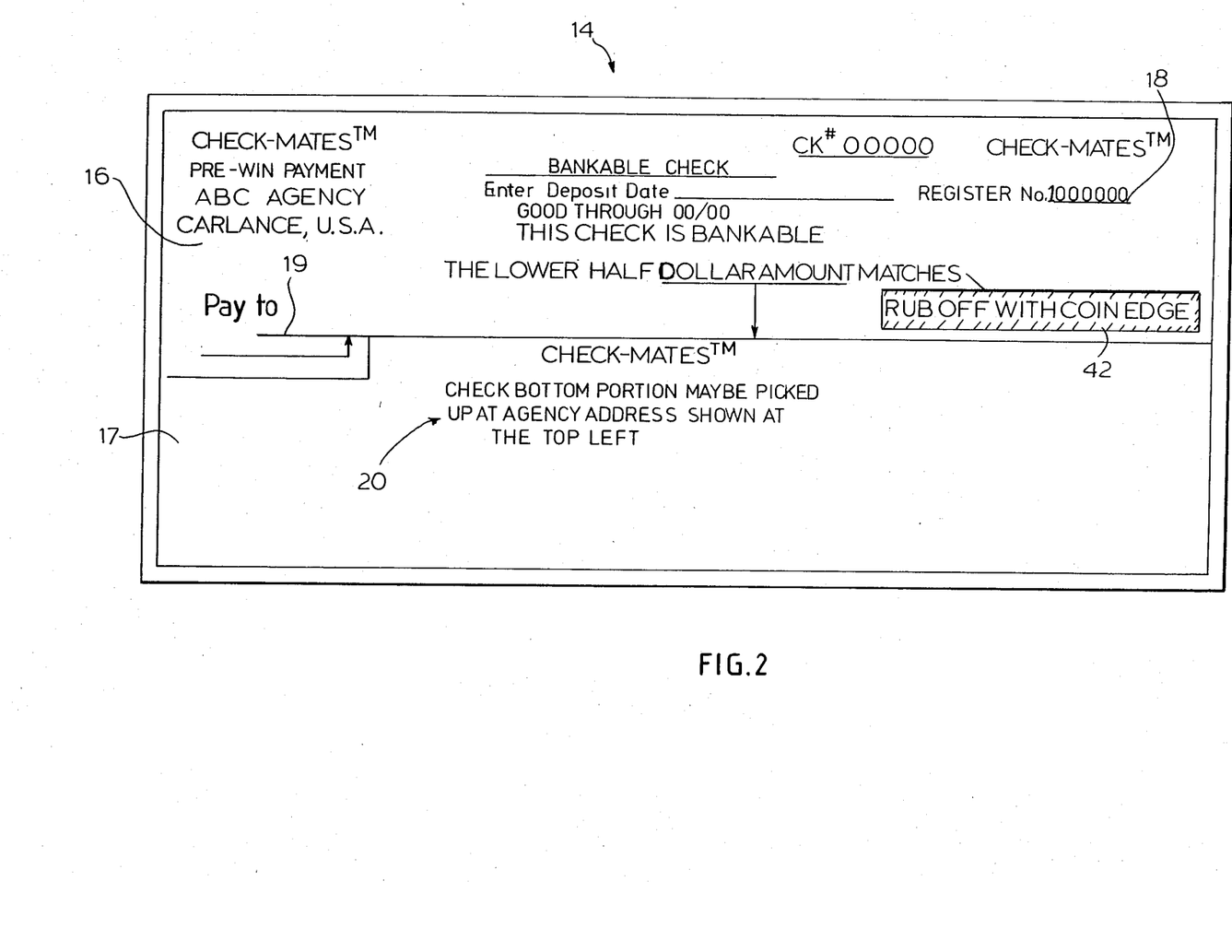
FIG. 2 is an elevated view of a front of a check having a top half matching portion.

FIG. 1 discloses a check back 10 having an endorsement space 12. FIG. 2 illustrates a check front sheet 14 having top portion 16 which conforms to a bankable negotiable instrument and a bottom portion 17. Register number 18 and payee line 19 are provided. Instructional literature 20 is provided on the lower portion 17 of sheet 14. Instructional literature 20 is used to instruct the consumer in how to use sheet 14 and top portion 16 to create a bankable instrument.

Figure 3:
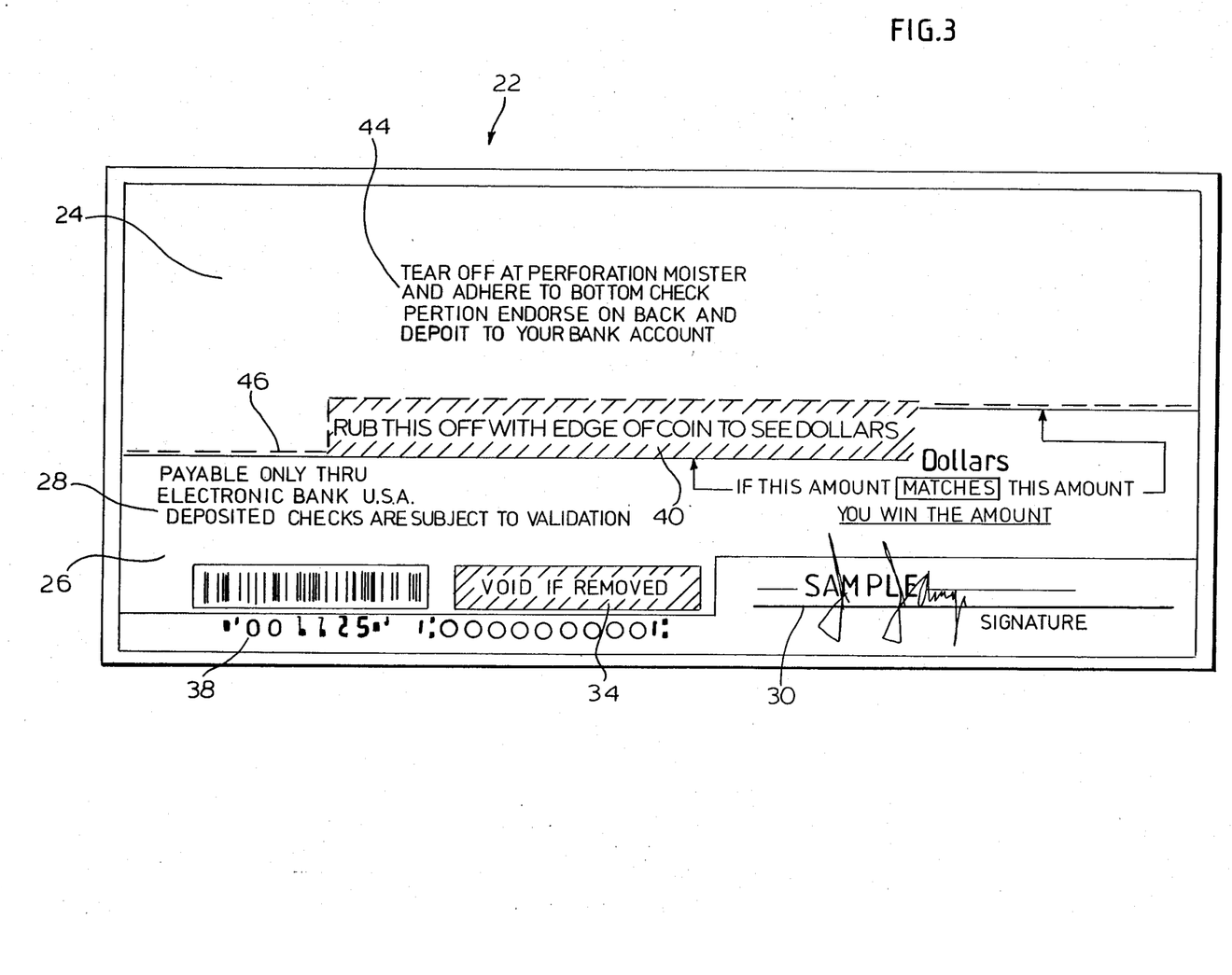
FIG. 3 is an elevated view of a front of a check having a bottom half matching portion.

FIG. 3 shows a sheet 22 having a top instructional portion 24 and a bottom portion 26 conforming to the bottom portion of a bankable check. Bottom part 26 includes validation reference 28 indicating that a time delay may occur for validation. Validation procedures are further discussed below. A signature line 30 is included to be signed in ink by the party responsible for payment of the check. The signature may be a preprint. Where the signature does not appear, the holder may be instructed to "See the Manager" of the local establishment for signature (i.e., car sales agency) or—the amount may exceed a sum subject to an I.R.S. withholding tax. Under this condition special instructions on the reverse side of the unsigned check will be printed. A "void if removed" label 34 contains a code number used in validation of the check, assuring that sheet 22 is an original issue sheet. The code number is derived from any mathematical formula of any printed numerals appearing such as the register number and the script dollar amount. Account number 38 may be used in the mathematical formula in support of the validation procedure.

The top part of sheet 22 contains instructions 44 for consumer handling of bottom portion 26 of sheet 22. A perforated tear away portion 46 is provided on sheet 22 to allow removal of bottom portion 26 from top portion 24 and affixation of bottom portion 26 to sheet 14 of FIG. 2.

Rub off area 40 is composed of a conventional opaque rub-off overlay material which covers the script dollar amount area of the check. As an alternate a peel-off overlay may be used. Rub off (or peel off overlay) area 42 of sheet 14 is also composed of an opaque overlay material covering a numerical dollar amount. Both the script dollar amount and the numerical dollar amount are covered by an opaque overlay to prevent selective pilferage during the distribution process and to establish in the participant's mind that selection for issue was not devised. If the script dollar amount matches the numerical dollar amount the consumer is a winner and may deposit or cash the bank draft at a bank indicated at 44 on sheet 22 (and 20 of sheet 14).

Figure 4:
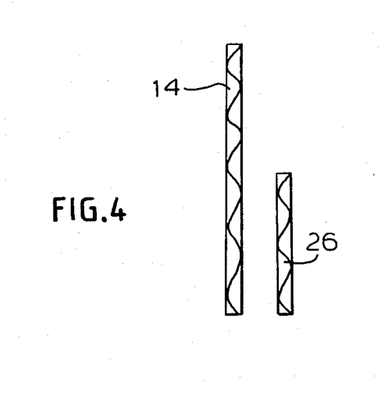
FIG. 4 is a section view of a bottom portion conforming to FIG. 3, the bottom portion being torn away along the easy tear perforation, and being mounted to the bottom portion of FIG. 2.

FIG. 4 is a section view of a base sheet 14 and a bottom portion 26 being adhered thereto by any conventional adhering means.

Figure 5:
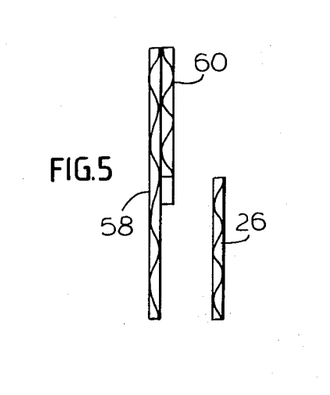
FIG. 5 is a section view similar to FIG. 4 including a lamina added to the upper portion of the base stock of FIG. 2.

FIG. 5 is a section view similar to FIG. 4 having top lamina portion 60 pre-affixed to base 58 so that upon adherence of bottom portion 26 to base 58 the outer surface of bottom portion 26 is flush with the outer surface of upper laminate 60 to provide a smooth surface check. A bank may accept a combined check when it is of more conventional physical stature.

Figure 6:
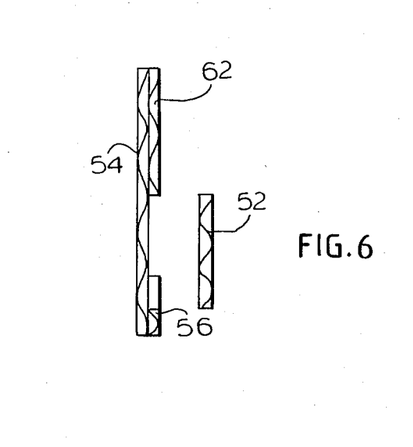
FIG. 6 is a section view of a bottom portion insert in accordance with FIG. 7 being affixed to a base having a top and a bottom laminated portion added.

FIG. 6 includes a base 54 having an upper laminate 62 and a lower laminate 56 adapted to receive insert 52 to complete the check.

Figure 7:
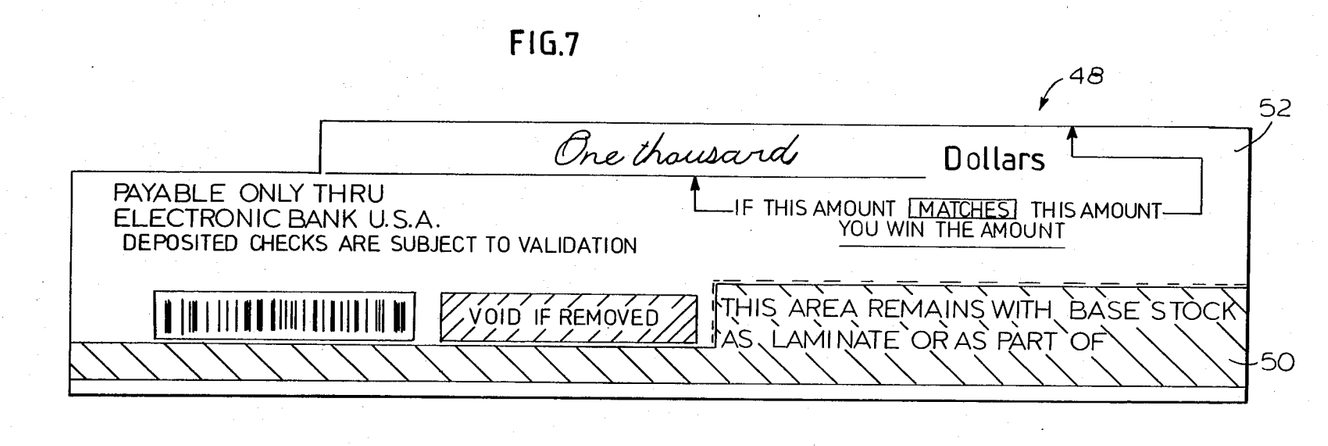
FIG. 7 is an elevated view of a front portion of a check showing an alternate embodiment of a bottom part matching portion conforming to FIG. 6.

FIG. 7 illustrates a bottom portion 48 of a check similar to that of FIG. 3 without an account number 38 or a signature line 30. Tear away portion 50 is provided so that insert 52 may be combined with base 54 (FIG. 6). Base 54 contains lower laminate portion 56 which contains the account number 38 and signature line 30. A script dollar amount ("one thousand") is also provided.

Figure 8:
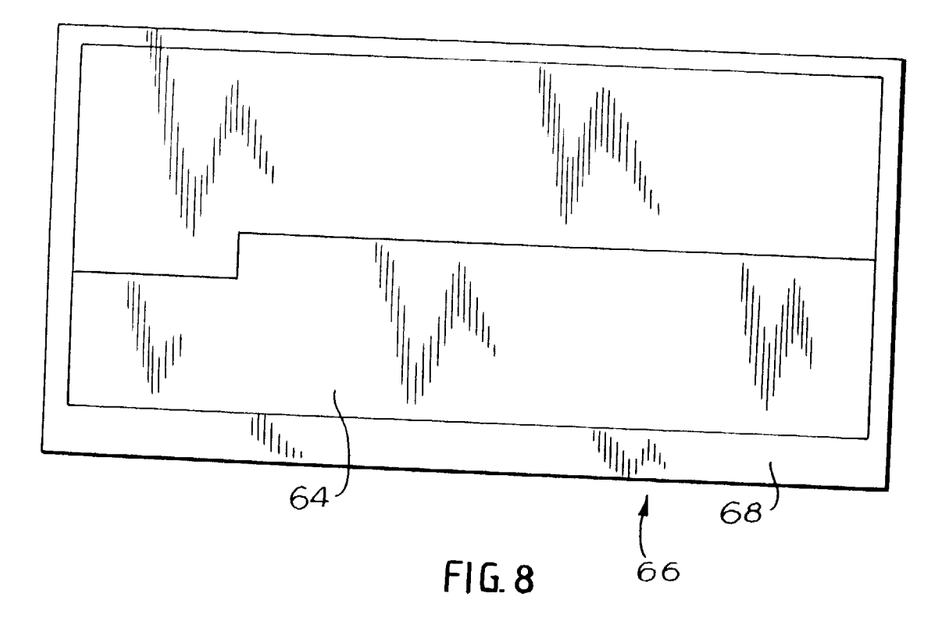
FIGS. 8 and 9 are further alternate embodiments related to FIG. 7, FIG. 8 being an elevated front view and FIG. 7 being a section view.
Figure 9:
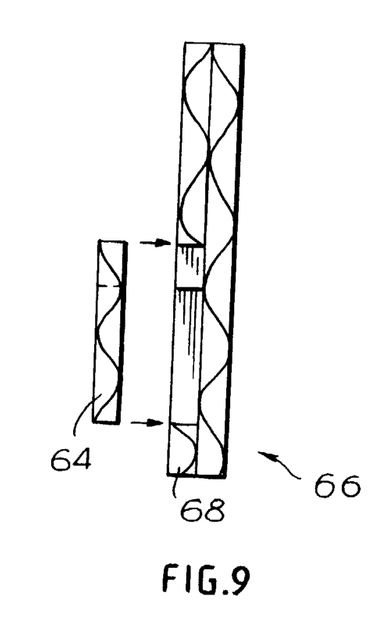

FIGS. 8 and 9 disclose an embodiment wherein part 64 acts as a plug into portion 66 which is double layered (as shown in section in FIG. 9), the top layer 68 being contiguous around its border and forming a 4-sided "socket" wall.

A description of the production and validation process follows. Upon selection of the desired potential win patterns, lists for printing of both TOP and BOTTOM check (draft) parts are computer generated. The control of the win liability is vested in the assignment of dollar amounts on the TOP Portion Check versus that of those on the BOTTOM Portion Checks. Lists on machine readable media only are to be supplied to the paper (check) printer.

The check printer will print the check numbers and other data (for bank reading) in magnetic inks at the bottom of the checks (not to exceed ⅝ inch height from check bottom exterior) and as a register number on the Top Portion Check at the top. Additionally, printed in standard indelible inks, are the script dollar amounts on the check portion and on the other check portion the numeric $ sign amount, both from a planned compatability computer generated list. Another number(s) will be generated by a complex mathematical formula using the check number, the register number, and the dollar amount. Any numerical sequence of numbers that appear on a check portion face are viable by mathematical equation to act in the validation process. Generated numbers will be printed under the void if removed covering and appear as a bar code or other machine readable code in another area of the check bottom part.

The lists (maintained by computer) will be encoded to save memory space and stored on hard disk or other mass data storage media memory at the validation computer.

Arrangements will be made to place equipment and an operator at the clearing bank premises, for validation of the checks prior to the clearing process.

This equipment shall be capable of:
(1) Reading (scanning) the numbers on the bottom of the check and the bar code and/or other machine readable codes.
(2) Receiving data from a keyboard.
(3) Communicating with the computer.
(4) Displaying and printing small amounts of data.

The computer will verify that both the check number and register number are valid for the check amount by referring to encoded files.

If check number and register number are valid, both records will be updated to reflect that validation has occurred, at which time a valid signal will be transmitted to the terminal (bank location computer).

If either check number or register number do not agree with the amount, or if either number has been flagged as previously validated, an invalid signal will be sent.

Upon receipt of a valid signal, the terminal will display and print selected elements of i.e., the check number, amount, and "valid". The operator will place the check in the valid stack and proceed with the next check.

Upon receipt of an invalid code, "invalid" will be displayed and printed on continuous paper roll. The operator will isolate the check for re-examination. Both valid and invalid displayed items may be printed on the same continuous role as they occur.

Any valid checks which appear improper in appearance to the operator will be set aside for verification of the number under the "Do Not Remove" area, and other examination for possible improprieties.

Any valid checks over $100.00 (or other amount to be established) will be re-examined and either passed for clearance or held subject to: rejected as altered, duplicated or forged. All checks will be returned to the clearing bank for concluding the banking process.

The disclosed embodiments effectively attain the objects and advantages of the present invention. Although preferred embodiments of the present invention are discussed, it should be understood that the present invention is not to be limited thereby, but is to be determined by the claims which follow.

We claim:

1. A sales promotional check in the form of a bankable draft for direct cashing or deposit at a bank, the bank draft comprising:
   a first preprinted sheet having at least a portion which conforms to a first part of a bankable bank draft and having indentifying information thereon;
   a second preprinted sheet comprising a second part of a bankable bank draft, the second part of the bankable draft containing identifying information thereon, said identifying information corresponding to the indentifying information on the first part of the bankable draft the first and second sheets firmly affixed adjacent one another by an adhering means to comprise a sheet to form the bankable bank draft.

2. A sales promotional check according to claim 1 further comprising verifying means for verifying that the first and second sheets were obtained from an authorized source.

3. A sales promotional check according to claim 2 wherein the identifying information on the first sheet further comprises a numerical dollar amount and the identifying information on the second sheet comprises a script dollar amount wherein the draft is bankable when the numerical dollar amount matches the script dollar amount.

4. A sales promotional check in accordance with claim 3 wherein the verifying means comprises a mathematical equation adapted to calculate combinations of any numerical reference found on the check portion's faces.

5. A sales promotional check in accordance with claim 4 wherein the verification means comprises a register number affixed to the first part and a machine readable code and a code number affixed to the second part and wherein the code number is covered by an opaque material to be removed only during verification procedures.

6. A sales promotional check in accordance with claim 3 wherein the first sheet comprises a top portion and a bottom portion, the top portion comprising a top part of the bank check or draft and the bottom portion comprising instructional literature, and the second sheet comprises a top portion and a bottom portion, the top portion being detachable from the bottom portion, the top portion comprising instructional literature and the bottom portion comprising a bottom part of the bank check or draft.

7. A sales promotional check in accordance with claim 6 wherein the first sheet further comprises a laminated layer on the upper portion having printing thereon and having a substantially equivalent thickness to the lower portion of the second sheet so that when the lower portion of the second sheet is affixed to the first sheet the surfaces of the sheets lie substantially flush with each other.

8. A sales promotional check in accordance with claim 2 wherein the second sheet comprises an insert affixed to the first sheet, the first sheet having top, bottom and sides laminated portions, the laminated portions being substantially equal in thickness to the insert, the insert, when affixed to the first sheet, completing the bank draft.

9. A sales promotional check in accordance with claim 8 wherein the second sheet comprises a script dollar amount, a machine readable code, and a number code disposed beneath a removable opaque layer, the bottom laminated portion comprising a signature line and an account number, and the top laminated portion comprising a payee line, a register number and a numerical dollar amount.

10. A sales promotional check in accordance with claim 6 wherein the top portion of the first sheet comprises a register number, a payee line, and a numerical dollar amount and wherein the bottom portion of the second sheet comprises a script dollar amount, a machine readable code, a code number covered by a removable opaque covering, an account number.

11. A sales promotional check in accordance with claim 1 wherein the bottom portion further comprises a signature.

12. A sales promotional check in accordance with claim 11 wherein both the numerical dollar amount and the script dollar amount are covered by a removable opaque layer.

13. A sales promotional check in accordance with claim 12 wherein the opaque code number is derived from both the script dollar amount and register number or any mathematical formula of printed numerals in combination to provide verification against forgery.

14. A sales promotional check in accordance with claim 13 wherein the code number is derived from both the script dollar amount and the register number or any mathematical formula of printed numerals in combination to avoid forgery.

15. A sales promotional check in accordance with claim 6 wherein the first sheet comprises a laminated portion having a bottom and a top layer, the top layer comprising a contiguous periphery and having a cut out portion for receiving the second sheet, and the second sheet adapted to being inserted into the cut out portion of the first sheet cooperating with the laminated portions.

16. A sales promotional check for direct cashing (or depositing) at a bank as a bank draft comprising:
a first sheet comprising a top and bottom portion, the top portion being a top part of a bank draft and the bottom portion having instructional literature therein, the top half further comprising a register number, a numerical dollar amount, and a payee line;
a second sheet comprising a top portion and a bottom portion, the top portion having instructional literature thereon and the bottom portion comprising the bottom part of a bank draft having a script dollar amount, a signature, a machine readable code, a code number and an account number, bank routing numbers, and a check number wherein the code number is derived from the register number and the script dollar amount and is used for validation purposes.

17. A method of providing a bank draft comprising the steps of:
printing a plurality of first sheets each sheet having a dollar amount and a payee line thereon;
printing a plurality of second sheets each sheet having a signature line, a dollar amount and a verification number, certain of the second sheets having matching dollar amounts to the first sheets, the second sheets being adapted to combine with the first sheets having matching dollar amounts to form a bankable bank draft;
providing at least one of the first sheets to a participant; and
providing at least one of the second sheets to the participant whereby, if the dollar amounts match, the first and second sheets are combined to form a bankable bank draft.

18. A method of providing a bank draft according to claim 17, further comprising the step of instructing the participant in how to obtain a second sheet by providing instructional literature on the first sheets.

19. A method for completing a bankable bank draft comprising the steps of:
providing a first pre-printed sheet of predetermined rectangular dimension having an upper portion and a lower portion and having indicia printed on the upper portion thereof corresponding to an upper portion of a negotiable bank draft;
providing a second pre-printed sheet of rectangular dimension equal to the first pre-printed sheet, the second pre-printed sheet having a perforation across the width thereof, separating the second pre-printed sheet into a lower portion containing indicia corresponding to a lower portion of a negotiable bank draft and an upper portion;
tearing the second pre-printed sheet along the perforation; and
firmly affixing the lower portion of the second pre-printed sheet to the lower portion of the first pre-printed sheet to create a bankable bank draft.

20. A sales promotional check in accordance with claim 2 wherein the validation means comprises a series of numerical characters located on each pre-printed sheet and derived from the numbers on that sheet which comprises a verification that the sheet upon which it is printed comes from an authorized source.

21. A sales promotional check in accordance with claim 2 wherein the first pre-printed sheet is rectangular in shape and wherein the second pre-printed sheet is firmly affixed to a lower portion of the first pre-printed sheet, covering a predetermined surface of the rectangular first sheet.

* * * * *

UNITED STATES PATENT AND TRADEMARK OFFICE
CERTIFICATE OF CORRECTION

PATENT NO. : 4,637,634

DATED : January 20, 1987

INVENTOR(S) : Seymour L. Troy et al

Page 1 of 2

It is certified that error appears in the above-identified patent and that said Letters Patent is hereby corrected as shown below:

Insert figure 8 and 9 as part of Letters Patent.

Signed and Sealed this

Seventh Day of June, 1988

Attest:

DONALD J. QUIGG

Attesting Officer

Commissioner of Patents and Trademarks